(12) United States Patent
Korber et al.

(10) Patent No.: US 7,784,412 B2
(45) Date of Patent: Aug. 31, 2010

(54) CONVERTIBLE COMPUTER DISPLAY

(76) Inventors: Jeffrey H. Korber, CBT Supply, Inc., P.O. Box 391, Hibernia, NJ (US) 07842; Michael G. Wisniewski, CBT Supply, Inc., P.O. Box 391, Hibernia, NJ (US) 07842

(*) Notice: Subject to any disclaimer, the term of this patent is extended or adjusted under 35 U.S.C. 154(b) by 367 days.

(21) Appl. No.: 11/903,986

(22) Filed: Sep. 25, 2007

(65) Prior Publication Data

US 2008/0072801 A1  Mar. 27, 2008

Related U.S. Application Data

(60) Provisional application No. 60/846,917, filed on Sep. 25, 2006.

(51) Int. Cl.
A47B 81/00 (2006.01)
(52) U.S. Cl. .................... 108/25; 312/223.3; 108/50.02
(58) Field of Classification Search .................... 108/25, 108/50.01, 50.02, 26; 312/223.3, 196, 208.1, 312/24–30
See application file for complete search history.

(56) References Cited

U.S. PATENT DOCUMENTS

| | | | | |
|---|---|---|---|---|
| 993,588 | A | * | 5/1911 | Donning ........................ 312/26 |
| 2,589,393 | A | * | 3/1952 | James ........................... 312/30 |
| 3,393,029 | A | * | 7/1968 | Ellis ............................. 312/25 |
| 4,590,866 | A | | 5/1986 | Schairbaum |
| 4,735,467 | A | | 4/1988 | Wolters |
| 4,766,422 | A | | 8/1988 | Wolters |
| 5,125,727 | A | | 6/1992 | Lechman |
| D329,551 | S | | 9/1992 | Lechman |
| D335,047 | S | | 4/1993 | Lechman |
| 5,199,773 | A | | 4/1993 | Price, Jr. et al. |
| D335,782 | S | | 5/1993 | Lechman |
| RE34,266 | E | | 6/1993 | Schairbaum |
| D342,396 | S | | 12/1993 | Lechman |
| 5,294,193 | A | | 3/1994 | Wegman |
| 5,410,972 | A | | 5/1995 | Schairbaum |
| D364,049 | S | | 11/1995 | Lechman |
| 5,526,756 | A | | 6/1996 | Watson |
| D372,601 | S | | 8/1996 | Roberts |
| 5,572,935 | A | | 11/1996 | Schairbaum |
| 5,611,608 | A | | 3/1997 | Clausen |
| 5,622,395 | A | | 4/1997 | Shine |
| 5,626,323 | A | | 5/1997 | Lechman |
| 5,651,594 | A | | 7/1997 | Lechman |
| 5,655,823 | A | | 8/1997 | Schairbaum |
| 5,685,236 | A | | 11/1997 | Lechman |
| 5,699,225 | A | | 12/1997 | Yavitz |
| 5,699,744 | A | | 12/1997 | Lechman |
| 5,740,743 | A | | 4/1998 | Schairbaum |
| 5,957,059 | A | | 9/1999 | Burham |
| 5,964,164 | A | | 10/1999 | Lechman |

(Continued)

*Primary Examiner*—Janet M Wilkens

(57) ABSTRACT

A convertible workstation system is disclosed that may be retrofitted into an existing desktop/work surface for supporting and pivoting a flat panel display such as a liquid crystal display (LCD) from a closed position to an open, viewable/usable position in front of a user. The system includes an actuator to initiate movement of a support panel, and is configured such that further movement of the support panel toward the open position after initiation by the actuator is carried out independently of further movement or other manipulation or control of the actuator. A spring may be provided to assist in moving the support panel towards such open position after the actuator has initiated such movement.

19 Claims, 4 Drawing Sheets

U.S. PATENT DOCUMENTS

| | | | |
|---|---|---|---|
| 6,019,051 | A | 2/2000 | Schairbaum |
| 6,085,431 | A | 7/2000 | Schairbaum |
| 6,092,883 | A | 7/2000 | Lechman |
| D429,088 | S | 8/2000 | Lechman |
| D429,579 | S | 8/2000 | Lechman |
| 6,128,186 | A | 10/2000 | Feierbach |
| 6,135,298 | A | 10/2000 | Lechman |
| 6,152,046 | A | 11/2000 | Schairbaum |
| 6,168,250 | B1 | 1/2001 | Rogov |
| D437,506 | S | 2/2001 | Lechman |
| D438,401 | S | 3/2001 | Lechman |
| D440,069 | S | 4/2001 | Lechman |
| 6,237,507 | B1 | 5/2001 | Yagisawa |
| 6,286,440 | B1 | 9/2001 | Jyrungi |
| 6,419,330 | B1 | 7/2002 | Lechman |
| 6,431,377 | B1 | 8/2002 | Lechman |
| 6,463,862 | B1 | 10/2002 | Kuhlman et al. |
| 6,474,760 | B2 | 11/2002 | Rauls |
| 6,553,919 | B1 | 4/2003 | Nevin |
| 6,601,931 | B1 | 8/2003 | Schairbaum |
| 6,609,465 | B2 | 8/2003 | Kolavo |
| 7,047,890 | B2 | 5/2006 | Korber et al. |
| 7,100,516 | B2 * | 9/2006 | Riddiford et al. ........ 108/50.01 |
| 7,509,912 | B2 * | 3/2009 | Stengel et al. ........... 108/50.01 |
| 7,578,243 | B2 * | 8/2009 | Gevaert ...................... 108/25 |
| 2003/0070592 | A1 * | 4/2003 | Grasse et al. ............ 108/50.02 |
| 2003/0230222 | A1 * | 12/2003 | Liu ........................ 108/50.01 |
| 2005/0145142 | A1 | 7/2005 | Korber et al. |
| 2006/0185564 | A1 | 8/2006 | Stengel et al. |
| 2006/0191445 | A1 | 8/2006 | Stengel et al. |
| 2008/0072803 | A1 * | 3/2008 | Korber et al. ............ 108/50.01 |
| 2008/0178778 | A1 * | 7/2008 | Koning et al. ................ 108/132 |

\* cited by examiner

CONVERTIBLE COMPUTER DISPLAY

CROSS REFERENCE TO RELATED APPLICATION

This application is based upon and claims benefit of copending U.S. Provisional Patent Application Ser. No. 60/846,917 entitled "Computer Workstation", filed with the U.S. Patent and Trademark Office on Sep. 25, 2006 by the inventors herein, the specification of which is incorporated herein by reference.

FIELD OF THE INVENTION

The present invention relates to computer workstations and, more particularly, to a computer workstation equipped with a pivoting work surface that deploys a computer display, and more particularly a flat panel computer display, from an existing desk or other like structure.

DESCRIPTION OF THE BACKGROUND

The advent of flat panel liquid crystal displays (LCDs) and plasma displays has changed the manner in which computer monitors must be mounted/supported and positioned for optimum "viewability." A LCD transmits images in a manner that is quite different from that found in a traditional cathode ray tube (CRT) monitor. A user must position himself/herself directly in front of a LCD, viewing it "straight on", to properly see the displayed images. A LCD's highly directional images and lower light emission levels make it difficult to position the unit on top of a traditional desk such that a user can view it straight on in an ergonomic manner, or to view the display's output through the glass surface found in the typical computer desk, as exemplified by that disclosed in U.S. Pat. No. RE 34266 to Schairbaum.

However, because LCDs offer many advantages over traditional CRT monitors, such as requiring less overall space and using less energy, there is a need for more functional, ergonomically correct, and convenient multi-use computer workstations designed to accommodate flat panel LCDs. While previous attempts have been made to provide a multi-use computer workstation accommodating a LCD that have achieved some measure of success, the actuation devices on such workstations have required relatively complex linkages between an input device support tray, such as a keyboard tray, and a pivotably mounted support panel. For instance, U.S. Pat. No. 7,047,890 and its progeny describe a computer workstation having a work surface with a central aperture and a pivoting LCD support panel pivotably mounted within such aperture, with lever arms situated between the support panel and a keyboard tray such that movement of the keyboard tray toward the user causes the support panel to pivot toward an open position, while movement of the keyboard tray away from the user and toward the workstation causes the support panel to pivot toward a closed position. Unfortunately, this complex linkage between the keyboard tray and the support panel unnecessarily increases manufacturing expenses, requiring multiple linkage components and increased complexity in assembly. Moreover, such complex linkage increases potential points of failure, as the damage or loss of a member in that linkage can result in an inability to open the work surface, thus rendering the computer display functionality of the workstation useless in the event of such a failure.

A need therefore remains to provide a multi-use computer workstation designed to accommodate flat panel LCDs that is of more simplistic construction and more easily convertible from a work surface to a computer display than has been offered by prior constructions.

SUMMARY OF THE INVENTION

The present invention provides a convertible workstation converting from a generally flat, planar work surface to a computer display. With regard to one aspect of a particularly preferred embodiment, the convertible workstation provides a traditional desk work environment having a generally planar work surface that is convertible to a flat panel computer display that positions such flat panel computer display in an ergonomically appropriate orientation such that images on the display may be viewed by a user positioned in front of the workstation.

With regard to another aspect of a particularly preferred embodiment, the convertible workstation includes a support panel having a top side and a bottom side, the support panel being pivotably mounted within a work surface from a closed position in which the top side is generally coplanar with the work surface to an open position. A spring is mounted between the support panel and the work surface and biases the support panel toward the open position. When the support panel holds a video display (such as a flat panel computer display) on its bottom side and is in the closed position, the biasing force is insufficient to move the support panel toward the open position. A pull cable is attached at a first end to the support panel, and a second end of the pull cable is engageable by a user such that pulling the pull cable in a direction away from the support panel when the support panel is in the closed position causes the support panel to begin to move toward the open position. Continued movement of the support panel after such motion toward the open position has begun then proceeds independent of movement of the pull cable.

With regard to yet another aspect of a particularly preferred embodiment, a workstation is provided that is convertible from a flat work surface and computer display storage device to a computer display. The workstation includes a support panel pivotably mounted within the flat work surface and moveable from a closed position in which the top side of the support panel is generally coplanar with the work surface to an open position. A computer display support bracket is affixed to the bottom side of the support panel, and is configured to hold a computer display in a stored position beneath the support panel when the support panel is in the closed position, and in a viewable position when the support panel is in the open position. A spring is mounted between the support panel and the flat work surface which exerts an opening force on the support panel when the support panel is in the closed position. A user accessible actuator engages the support panel and is configured to cause the support panel to begin to move toward the open position when actuated. Continued movement of the support panel toward the open position after such actuation is then independent of movement of the actuator.

With regard to still yet another aspect of a particularly preferred embodiment, a work surface is provided that is convertible to a computer display. The work surface includes a frame configured for insertion into a work table. A support panel is pivotably mounted within the frame and is moveable from a closed position, in which the top side of the support panel is generally coplanar with a top edge of the frame, to an open position. A computer display support bracket is affixed to the bottom side of the support panel and is configured to hold a computer display. A spring is mounted between the support panel and the frame and exerts an opening force on the support panel when the support panel is in the closed position. A user accessible actuator engages the support panel and is configured to cause the support panel to begin to move toward the open position when actuated. Continued movement of the support panel toward the open position after such actuation is then independent of movement of the actuator.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE PREFERRED EMBODIMENTS

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
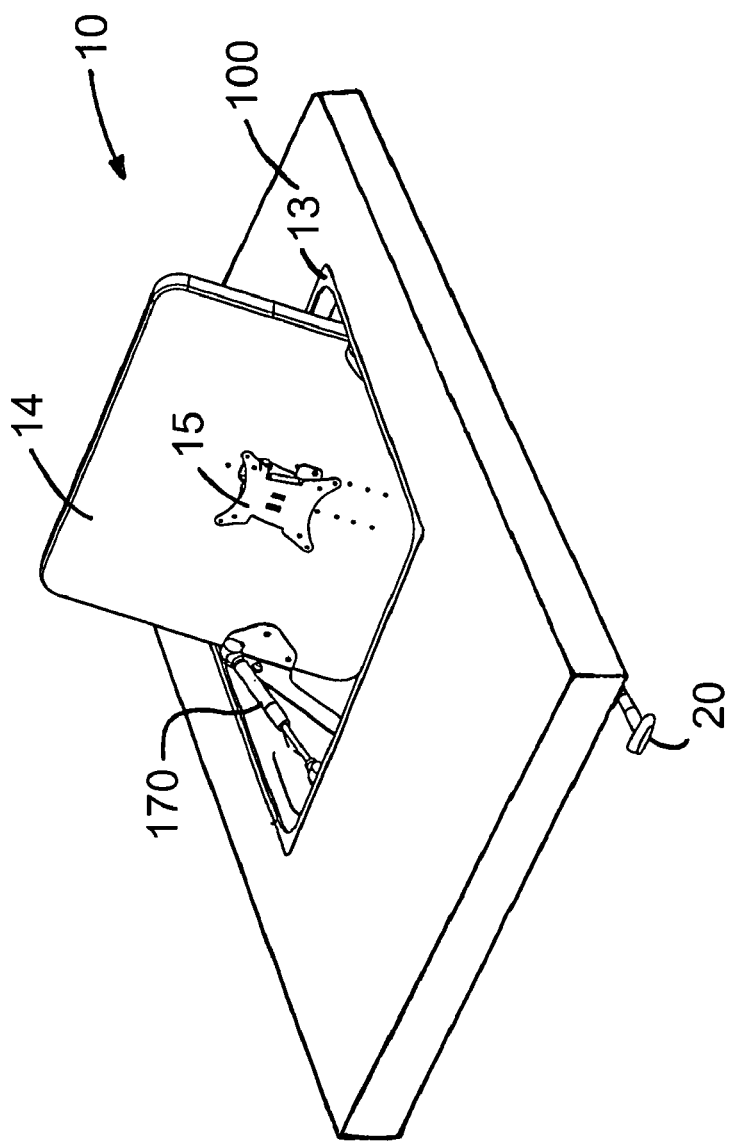
FIG. 1 is a side, perspective view of a convertible computer display in an open position in accordance with a first particularly preferred embodiment of the invention.
Figure 2:
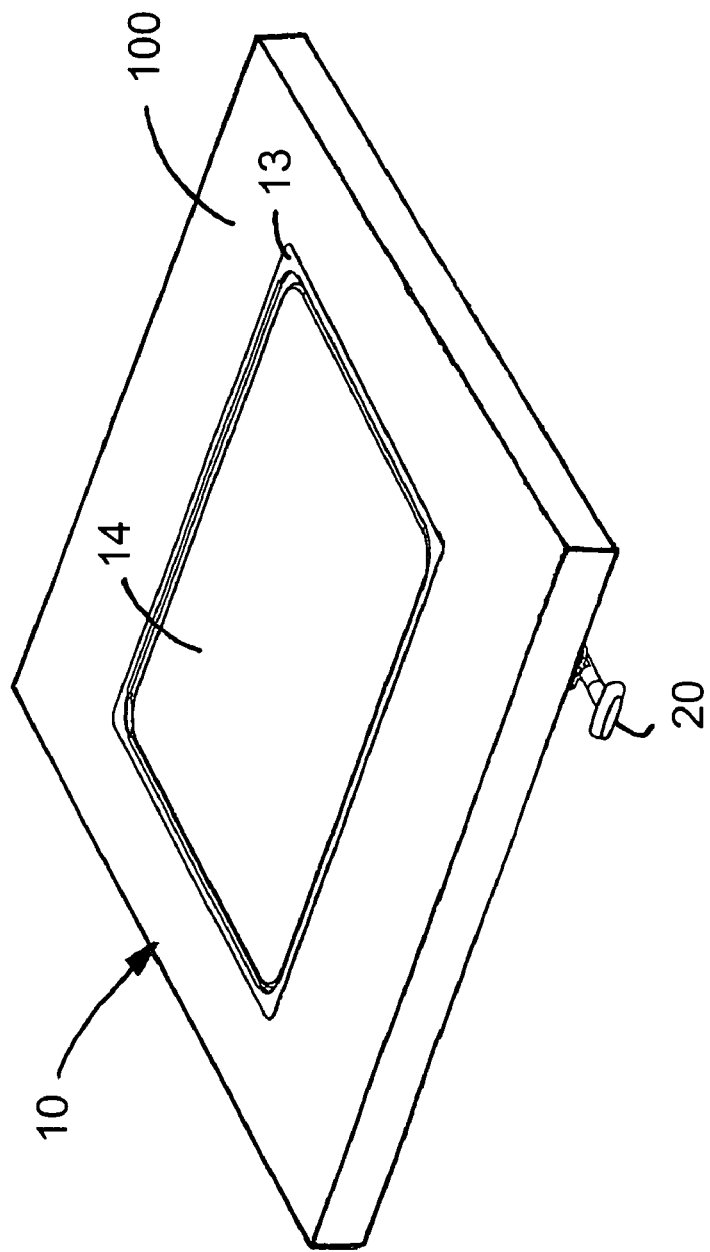
FIG. 2 is a side, perspective view of the convertible computer display of FIG. 1 in a closed position.

FIG. 1 is a front perspective view of a convertible workstation (shown generally at 10), according to a first preferred embodiment of the present invention, in an open position, and FIG. 2 shows such convertible workstation in a closed position. In this first embodiment, the workstation system 10 generally includes a pivoting support panel 14 pivotably mounted within an opening in a work surface 100. A frame 13 may be situated within such opening in work surface 100, such that support panel 14 may be pivotably mounted within frame 13. Support panel 14 is adapted to support an integrated flat panel computer display (e.g., an LCD, plasma display or other similarly configured computer display, not shown) mounted thereon via bracket 15. Bracket 15 may comprise a VESA bracket. A spring member, such as a gas spring 170, is situated between support panel 14 and frame 13 and biases support panel 14 to the open position shown in FIG. 1.

Spring 170 is selected and positioned with respect to frame 13 and support panel 14 such that when support panel 14 is closed (as shown in FIG. 2) and holding a flat panel computer display on bracket 15, the opening force applied to support panel 14 (and particularly the vector component of such force that is perpendicular to the bottom side of support panel 14) is insufficient to overcome the combined weight of support panel 14 and such flat panel computer display, such that support panel 14 remains in the closed position shown in FIG. 1. However, as support panel 14 begins to pivot toward the open position shown in FIG. 2, the vector component of the force applied by spring 170 that is perpendicular to support panel 14 increases (as the direction of application of such force approaches 90° to the bottom side of support panel 14). As a result, the combination of the momentum of support panel 14 and the force applied by spring 170 (or alternately the force applied by spring 170 alone) becomes sufficient to continue such opening motion of support panel 14, until support panel 14 comes to rest in the open position shown in FIG. 1.

Thus, spring 170 is selected and positioned with respect to support panel 14 and work surface 100 so as to keep the support panel closed (i.e., the top of the support panel flush with the top of work surface 100 in which it is installed) when in its lowered position (and preferably when carrying a flat panel computer display on bracket 15), and to cause support panel 14 to tilt upward to a fully open position after a slight opening force is applied to support panel 14.

With particular regard to the embodiment of FIG. 1, in order to provide such opening force, a mechanical connection may be provided between a point on the bottom side of support panel 14 and an actuator device, such as pull handle 20, such that pulling on the actuator device applies a slight opening force, starting movement of the support panel towards the open position shown in FIG. 1. After application of such force, the momentum of support panel 14 and the force applied by spring 170 (or alternately the force applied by spring 170 alone) causes support panel 14 to swing to the fully open position shown in FIG. 1, irrespective of further movement of the actuator device. As mentioned above, spring 170 may comprise a gas spring, thus simultaneously serving as a damping mechanism to dampen the movement of support panel 14 to allow it to gently approach its fully open, viewable position in front of a user. In order to return support platform 14 to the closed position, the user may simply push downward on the top side of support platform 14 to pivot it downward to the closed position of FIG. 2, again irrespective of any movement of the actuator device.

Figure 3:
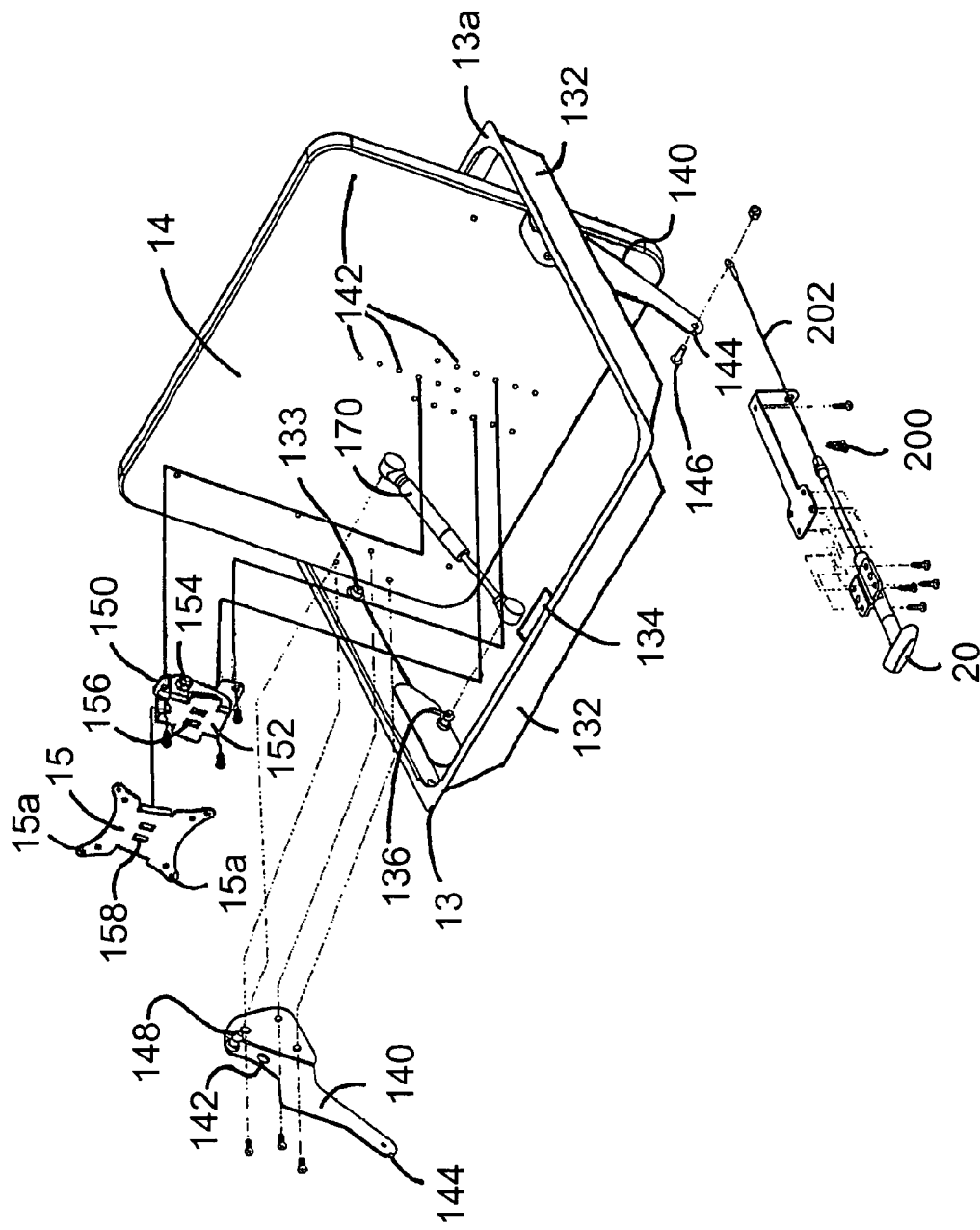
FIG. 3 is an exploded view of the convertible computer display of FIG. 1.

FIG. 3 provides an exploded view of the convertible workstation of FIG. 1. Frame 13 is provided pivot pins 133 for pivotably mounting support panel 14. Frame 13 may include a generally horizontal top lip 13a which engages the top surface of work surface 100; alternately, top lip 13a may be eliminated such that the entirety of frame 13 sits within the opening in work surface 100, and in which case frame 13 is fastened to such opening by way of fasteners (e.g., screws, nails, etc.), adhesives, or the like, or may even be integrally formed (e.g., molded) with work surface 100. Flanges 132 are preferably provided along each side of frame 13, each extending down from the top lip 13a of frame 13. A support panel stop 134 is preferably provided on a top edge of frame 13 facing the interior of the frame, providing a lower stop for support panel 14 as it moves towards the closed position of FIG. 2. Spring member 170, such as a gas spring, is provided on an interior face of frame 13 and positioned between frame 13 (by way of pivotal spring connector 136) and support panel 14 (by way of pivotal spring connector 148 on pivot support 140, discussed below).

Support panel 14 is a generally rectangular panel having a bottom side (visible in FIGS. 1 and 3) and a top side (visible in FIG. 2), which top side preferably has a surface matching that of the top of work surface 100. Support panel 14 is also preferably provided a series of threaded openings 142 allowing connection of pivot supports 140 and computer display bracket 15. Alternately, pivot supports 140 and/or computer display bracket 15 may be formed integrally with support panel 14. Pivot supports 140 provide an opening 142 configured to receive a pivot pin 133 on frame 13, thus pivotably mounting support panel 14 with respect to frame 13 (and thus with respect to work surface 100). At least one of pivot supports 140 also preferably provides an extending arm 144 having a pin connection 146 receiving an end of a pull cable (shown generally at 200), as discussed in greater detail below. Likewise, at least one of pivot supports 140 provides a pivotal spring connector 148, such that a spring member 170 may be connected between pivotal spring connector 148 affixed to support panel 14 (through pivot support 140) and a pivotal spring connector 136 on frame 13, preferably biasing support panel 14 toward the open position of FIG. 1.

Display bracket 15 is preferably a VESA bracket configured to releasably hold a flat panel computer display. A base unit 150 may be attached to support panel 14 using screws or similarly fashioned fasteners, base unit 150 having a pivoting flat panel computer display mount 152 pivotably connected to base unit 150 via pivot connection 154. At least one opening 156 is provided in the face of mount 152 through which a locking finger (not shown) extends when support panel 14 is in the closed position shown in FIG. 2, which locking finger retracts when support panel 14 is raised to the open position shown in FIGS. 1 and 3. Display bracket 15 in turn is configured to slidably engage display mount 152, and is provided holes 15a allowing threaded attachment to the back of a flat panel computer display. As with mount 152, display bracket 15 likewise has at least one opening 158 extending therethrough and positioned to align with opening 156 in mount 152 such that the locking finger of base unit 150 may likewise extend through display bracket 15, thus preventing removal of display bracket 15 (and thus removal of a flat panel computer display to which it is attached) when support panel 14 is in the closed position.

As best seen in FIG. 3, in order to move support panel 14 from its closed position to its open position, a pull cable (shown generally at 200) is provided (preferably attached to an underside of work surface 100) having a pull handle 20 accessible to a user and a flexible cord 202 pivotably mounted at a first end to an extending arm 144 of one of pivot supports 140 through pin connection 146, and mounted at the opposite end to the pull handle 20. Thus, pulling the handle results in pulling extending arm 144 outward, causing support panel 14 to begin to pivot towards its open position.

It will be recognized by those of ordinary skill in the art that movement of pull handle 20 does not correlate to movement of support panel 14. For instance, initiating outward movement of pull handle 20 a short distance outward from work surface 100 and then stopping such movement will still allow support panel 14 to swing from its closed position to its fully open position, again as a result of spring 170. Likewise, inward movement of pull handle 20 back to its initial position does not result in opposite rotation of support panel 14 towards a closed position. Rather, closure of support platform 14 is carried out by simply pushing on a top edge of open support platform 14 towards the closed position, and guiding it by hand downward until it is fully closed and flush with the work surface 100.

Figure 4:
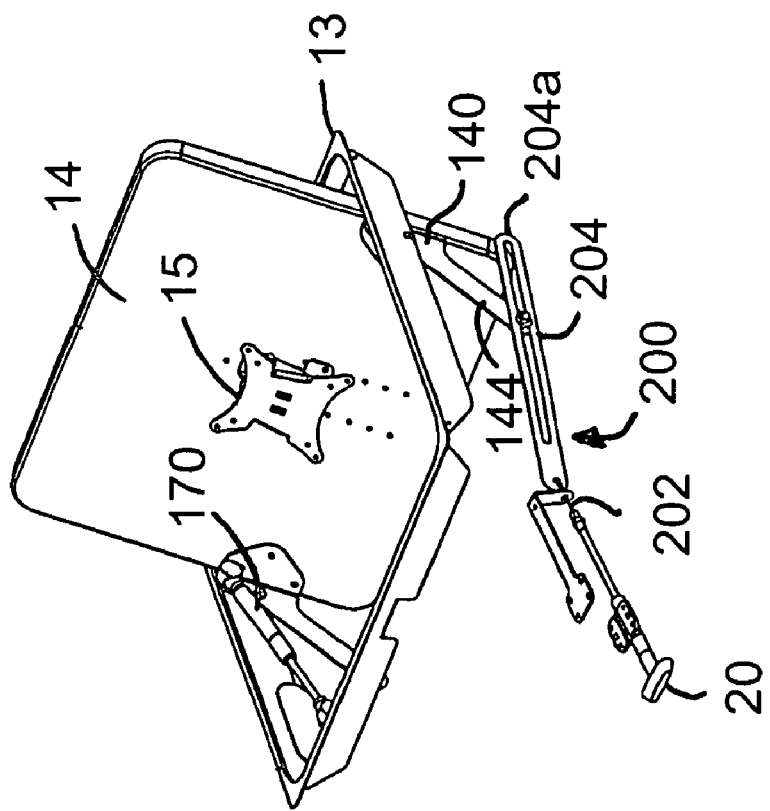
FIG. 4 is a side, perspective view of a convertible computer display according to a first alternate embodiment of the invention.

With regard to a first alternate embodiment of the invention, as shown in FIG. 4, pull cable assembly 200 may include a link 204 having a central opening that rotatably and slidably receives arm 144 of pivot support 140. Link 204 is attached to flexible cord 202, which in turn is connected to pull handle 20, such that pulling handle 20 results in pulling link 204 outward. When support platform 14 is closed and pull handle 20 is fully retracted, arm 144 of pivot support 140 is adjacent to a back edge 204a of link 204. Thus, as pull handle 20 is pulled outward, arm 144 of pivot support 140 is likewise pulled outward, causing support platform 14 to begin to pivot towards the open position. Thereafter, spring 170 continues to push support platform 14 through the rest of the opening swing to a fully opened position, regardless of the position of pull handle 20 or link 204. Closure of support platform 14 is then again carried out by simply pushing on a top edge of open support platform 14 towards a closed position, and guiding it by hand downward until it is fully closed and flush with the work surface 100.

The flat panel workstation system 10 may be adapted for retrofit installation into an existing desk top/work surface 100. Toward this end, the flat panel workstation system 10 may be provided in kit form including an assemblage of components, inclusive of a collar 13 for installation in an aperture cut into any substantially flat desk top/work surface 100, and a pivoting support panel 14 for installation into collar 13 for pivotably supporting the flat panel computer display within the aperture. The collar 13 and support panel 14 preferably sit flush with the desk top/work surface 100 when the panel 14 is closed. A similar method for installing a workstation system 10 is described in U.S. patent application Ser. No. 10/971,571, the specification of which is incorporated herein by reference.

Having now fully set forth the preferred embodiments and certain modifications of the system and method concepts underlying the present invention, various other embodiments as well as certain variations and modifications of the embodiments herein shown and described will obviously occur to those skilled in the art upon becoming familiar with said underlying concept. For instance, while the above embodiments particularly describe a pull handle 20 used as an actuation device for initiating the opening movement of support panel 14, those of ordinary skill in the art will readily recognize that other devices could likewise be used as an actuation device to initiate such opening movement. For instance, a keyboard tray may be positioned below work surface 100 with flexible cord 202 or link 204 attached to the keyboard tray instead of pull handle 20, so long as movement of the keyboard tray or other actuation device after causing initial movement of the support panel 14 toward the open position is independent of further movement of support panel 14. It is to be understood, therefore, that the invention may be practiced otherwise than as specifically set forth herein.

The invention claimed is:

1. A convertible workstation comprising:
a support panel having a top side and a bottom side, said support panel being pivotably mounted within a work surface from a closed position in which said top side is generally coplanar with said work surface to an open position;
a spring mounted between said support panel and said work surface, said spring biasing said support panel toward said open position and exerting a biasing force on said support panel toward said open position, wherein when said support panel holds a video display on said bottom side and is in said closed position, said biasing force is insufficient to move said support panel toward said open position; and
a pull cable having a first end attached to said support panel and a second end engageable by a user such that pulling said pull cable in a direction away from said support panel when said support panel is in said closed position causes said support panel to begin to move toward said open position, and movement of said support panel thereafter is independent of movement of said pull cable.

2. The convertible workstation of claim 1, wherein said spring is a nonlinear spring.

3. The convertible workstation of claim 1, wherein said spring is a gas spring.

4. The convertible workstation of claim 1, further comprising an input device platform slidably attached to a bottom side of said work surface, wherein said second end of said pull cable is attached to said input device platform.

5. The convertible workstation of claim 1, further comprising a pull handle mounted on a bottom side of said work surface, wherein said second end of said pull cable is attached to said pull handle.

6. The convertible workstation of claim 1, further comprising a frame positioned between at least a portion of said support panel and said work surface.

7. A convertible workstation, comprising:
   a support panel pivotably mounted within a flat work surface and having a top side and a bottom side, said support panel being moveable from a closed position in which said top side is generally coplanar with said work surface to an open position;
   a computer display support bracket affixed to said bottom side of said support panel, said computer display support bracket configured to hold a computer display in a stored position beneath said support panel when said support panel is in said closed position and configured to hold a computer display in a viewable position when said support panel is in said open position;
   a spring mounted between said support panel and said flat work surface and exerting an opening force on said support panel; and
   a user accessible actuator engaging said support panel, said actuator being configured to cause said support panel to begin to move toward said open position when actuated, wherein continued movement of said support panel toward said open position after such actuation is independent of movement of said actuator.

8. The workstation of claim 7, wherein continued movement of said support panel toward said open position after such actuation is carried out solely by momentum of said support panel and said spring.

9. The workstation of claim 7, wherein said spring is a nonlinear spring.

10. The workstation of claim 7, wherein said spring is a gas spring.

11. The workstation of claim 7, wherein said actuator further comprises a pull cable having a first end attached to said support panel and a second end engageable by a user such that pulling said pull cable in a direction away from said support panel when said support panel is in said closed position causes said support panel to begin to move toward said open position.

12. The workstation of claim 11, said actuator further comprising an input device platform slidably attached to a bottom side of said flat work surface, wherein said second end of said pull cable is attached to said input device platform.

13. The workstation of claim 11, said actuator further comprising a pull handle mounted on a bottom side of said flat work surface, wherein said second end of said pull cable is attached to said pull handle.

14. The workstation of claim 7, further comprising a frame positioned between at least a portion of said support panel and said work surface.

15. A convertible work service, comprising:
   a frame configured for insertion into a work table;
   a support panel pivotably mounted within said frame and having a top side and a bottom side, said support panel being moveable from a closed position in which said top side is generally coplanar with a top edge of said frame to an open position;
   a computer display support bracket affixed to said bottom side of said support panel and configured to hold a computer display;
   a spring mounted between said support panel and said frame and exerting an opening force on said support panel; and
   a user accessible actuator engaging said support panel, said actuator being configured to cause said support panel to begin to move toward said open position when actuated, wherein continued movement of said support panel toward said open position after such actuation is independent of movement of said actuator.

16. The work surface of claim 15, wherein continued movement of said support panel toward said open position after such actuation is carried out solely by momentum of said support panel and said spring.

17. The workstation of claim 15, wherein said spring is a nonlinear spring.

18. The workstation of claim 15, wherein said spring is a gas spring.

19. The workstation of claim 15, wherein said actuator further comprises a pull cable having a first end attached to said support panel and a second end engageable by a user such that pulling said pull cable in a direction away from said support panel when said support panel is in said closed position causes said support panel to begin to move toward said open position.

* * * * *